US008213746B2

(12) United States Patent
Volovelsky et al.

(10) Patent No.: US 8,213,746 B2
(45) Date of Patent: Jul. 3, 2012

(54) SUPER-RESOLUTION IMAGE PROCESSING (75) Inventors: Karni Volovelsky, Misgav (IL); Motti Golan, Jerusalem (IL); Nitzan Goldberg, Jerusalem (IL)

(73) Assignee: Rafael Advanced Defence Systems Ltd, Haifa (IL)

( * ) Notice: Subject to any disclaimer, the term of this patent is extended or adjusted under 35 U.S.C. 154(b) by 1067 days.

(21) Appl. No.: 10/597,561

(22) PCT Filed: Feb. 1, 2005

(86) PCT No.: PCT/IL2005/000116
§ 371 (c)(1),
(2), (4) Date: Jul. 14, 2008

(87) PCT Pub. No.: WO2005/072060
PCT Pub. Date: Aug. 11, 2005

(65) Prior Publication Data
US 2008/0260279 A1 Oct. 23, 2008

(30) Foreign Application Priority Data

Feb. 1, 2004 (IL) .......................................... 160152

(51) Int. Cl.
G06K 9/32 (2006.01)
G09G 5/02 (2006.01)

(52) U.S. Cl. ........................................ 382/299; 345/698
(58) Field of Classification Search .................. None
See application file for complete search history.

(56) References Cited

U.S. PATENT DOCUMENTS
5,649,032 A 7/1997 Brut et al.
(Continued)

FOREIGN PATENT DOCUMENTS
IL 160152 2/2004

OTHER PUBLICATIONS

Stephen E. Reichenbach et al :"Restoration and Reconstruction from Overlapping Images for Multi-Image Fusion", IEEE Transactions on Geoscience and Remote Sensing, vol. 39, No. 4, Apr. 2001, pp. 769-776.

(Continued)

Primary Examiner — Randolph I Chu
(74) Attorney, Agent, or Firm — Mark M. Friedman (57) ABSTRACT

A method for iterative derivation of a master image from sampled images of non-identical, at least partially overlapping, regions of a scene. The method includes defining a transformation operator mapping positions within the master image to corresponding positions in the sampled image; a distortion operator simulating a modulation transfer function associated with an imaging sensor from which the sampled image was generated; and a sampling operator for reducing an image from the output resolution to the resolution of the sampled image. For each sampled image the transformation operator, distortion operator and sampling operator are applied to a current master image hypothesis to generate a predicted image A difference image is calculated which has pixel values corresponding to the difference in corresponding pixel values between the sampled image and the predicted image. A back-projection of each of the difference images is performed to generate a correction image for the current master image hypothesis. Finally, the correction images are employed to perform a correction to the current master image hypothesis to generate a new master image hypothesis. The correction to the current master image hypothesis includes combining the correction images by deriving a weighted average of values of corresponding pixels in the correction images. The weight of each pixel in each correction image is calculated as a function of a distance as measured in the sampled image between: a point in the sampled image to which the pixel in the correction image is mapped by the transformation operator, and at least one pixel centroid proximal to that point.

5 Claims, 5 Drawing Sheets

U.S. PATENT DOCUMENTS 6,456,339 B1 9/2002 Surati et al.
2009/0102950 A1* 4/2009 Ahiska .................. 348/240.2

OTHER PUBLICATIONS

Michal Irani et al :"Super Resolution From Image Sequences",Proceedings of the International Conference on Pattern Recognition, Atlantic City, vol. 2, Jun. 16-21, 1990 pp. 115-120.

Irani M et al: "Super resolution from image sequences" Proceedings of the International Conference on Pattern Recognition, Atlantic City, vol. 2, Jun. 16-21, 1990, pp. 115-120.

Reichenbach et al:"Restoration and Reconstruction from Overlapping Images for Multi-Image Fusion", IEEE Transactions on Geoscience and Remote Sensing, vol. 39, No. 4, Apr. 2001, pp. 769-780.

M. Irani, et al.; "Motion analysis for image enhancement resolution, occlusion, and transparency", Jour. Visual Communication and Image Representation, vol. 4, Dec. 1993,pp. 324-335.

Assaf Zomet and Shmuel Peleg "Efficient super-resolution and application to mosaics" School of Computer Science and Engineering,The Hebrew University of Jerusalem.

* cited by examiner

SUPER-RESOLUTION IMAGE PROCESSING

FIELD AND BACKGROUND OF THE INVENTION

The present invention relates to image processing and, in particular, it concerns super-resolution image processing in which a plurality of overlapping sampled images are processed to generate one or more image of resolution and quality greater than that of the original sampled images.

The term "super-resolution" is used to refer generically to a group of techniques through which information from overlapping regions of multiple image frames can be used to improve the resolution of, and reduce noise and blurring in, a resultant image frame. In one super-resolution methodology, described in M. Irani, et al., "Motion Analysis For Image Enhancement Resolution, Occlusion, And Transparency," Jour. Visual Communication And Image Representation, Vol. 4, No. 4, December, 1993, pp. 324-335, particularly section 3 thereof, a super-resolution methodology is described in which, starting with an initial guess as to an appropriate super-resolution image of a scene, a plurality of low-resolution images are generated and compared to actual low-resolution images which were recorded of the scene. By determining differences between the generated and actual low-resolution images, an error function is developed which is used in updating the initial guess super-resolution image. This process can be repeated through a series of iterations until a final super-resolution image is generated with enhanced resolution over the actual low-resolution images.

An essentially similar approach is also described in a paper by Assaf Zomet and Shmuel Peleg entitled "Efficient Super-Resolution and Application to Mosaics" (Proceedings of the International Conference on Pattern Recognition (ICPR), Barcelona, September 2000). The algorithm in question is there referred to as an "iterative back-projection" algorithm. Both the Irani et al. and Zomet et al. papers are hereby incorporated by reference and are believed to provide an understanding of the theoretical basis and general state of the art against which background the present invention may be better understood.

Practical implementations of the iterative back-projection methodology are typically computationally heavy and often suffer from problems of slow convergence, requiring relatively large numbers of iterations to reach an acceptable solution.

There is therefore a need for an implementation of iterative back-projection which would enhance the quality of the resulting super-resolution image and/or would enhance the rate of convergence of the algorithm towards an acceptable solution, thereby reducing the computational load and processing time for performing the super-resolution processing.

SUMMARY OF THE INVENTION

The present invention is a method and corresponding image processing system for iterative derivation of a relatively high-resolution master image from a plurality of lower resolution sampled images of non-identical, at least partially overlapping, regions of a scene. The present invention also provides a technique, useful both alone and as part of the iterative derivation, for combining a plurality of input images into a single higher resolution output image.

According to the teachings of the present invention there is provided, a method for iterative derivation of a master image from a plurality of sampled images of non-identical, at least partially overlapping, regions of a scene, the master image having an output resolution greater than a maximum resolution of the sampled images, the method comprising: (a) for each sampled image, defining: (i) a transformation operator F mapping positions within the master image to corresponding positions in the sampled image, (ii) a distortion operator H simulating a modulation transfer function associated with an imaging sensor from which the sampled image was generated, and (iii) a sampling operator D for reducing an image from the output resolution to the resolution of the sampled image; (b) for each sampled image, applying the transformation operator, the distortion operator and the sampling operator to a current master image hypothesis so as to generate a predicted image, and calculating a difference image having pixel values corresponding to the difference in corresponding pixel values between the sampled image and the predicted image; (c) performing back-projection of each of the difference images to generate a correction image for the current master image hypothesis; and (d) employing the correction images to perform a correction to the current master image hypothesis to generate a new master image hypothesis.

According to a first aspect of the present invention, the correction to the current master image hypothesis includes combining the correction images by deriving a weighted average of values of corresponding pixels in the correction images, the weight of each pixel in each correction image being calculated as a function of a distance as measured in the sampled image between: (i) a point in the sampled image to which the pixel in the correction image is mapped by the transformation operator; and (ii) at least one pixel centroid proximal to the point.

According to a further feature of the present invention, the function of a distance is derived from distortion operator H.

According to a further feature of the present invention, distortion operator H corresponds to a combination of a modulation transfer function resulting from an optical system of the imaging sensor and a modulation transfer function resulting from a distortion generated by a sensor element array of the imaging sensor.

According to a second complementary or alternative aspect of the present invention, distortion operator H corresponds to a modulation transfer function describing only a first portion of a distortion generated by the imaging sensor, the method further comprising a post-processing step of deconvoluting a final master image hypothesis to substantially correct a modulation transfer function describing a remainder of a distortion generated by the imaging sensor.

According to a third complementary or alternative aspect of the present invention, the back projection includes employing an operator $H^{bp}$ corresponding to a pseudo-inverse of distortion operator H, wherein $H^{bp}$ approximates to an inverse of H at spatial frequencies below a given value and approaches zero at spatial frequencies above the given value.

According to a further feature of the present invention, the back projection includes employing an operator $H^{bp}$ corresponding to a pseudo-inverse of distortion operator H, wherein $H^{bp}$ is chosen to substantially satisfy the condition:

$$H^{bp} \times D^t \times D \times H = I$$

wherein:

I is the unit operator for an image of the output resolution;
D is a sampling operator for reducing an image from the output resolution to the resolution of an input image; and
$D^t$ is an inflation operator for expanding an image from the resolution of the input image to the output resolution.

There is also provided according to the teachings of the present invention, a method for combining a plurality of input images relating to non-identical but at least partially overlapping regions of a scene to form an output image, the output image having an output resolution greater than a maximum resolution of the input images, the method comprising: (a) defining a mapping between pixel locations in each input image and corresponding positions within the output image; (b) employing the mapping and an interpolation methodology to generate from each input image an output component image at the output resolution; and (c) combining the output component images by deriving a weighted average of values of corresponding pixels in the output component images, thereby generating the output image, wherein the weight of each pixel in each output component image is calculated as a function of a distance between a point in the input image corresponding to the pixel position in the output component image and at least one adjacent pixel centroid in the input image.

According to a further feature of the present invention, the function of a distance is derived from a modulation transfer function associated with an imaging sensor from which the input images were at least partially derived.

According to a further feature of the present invention, the input images are differential images corresponding to the difference in pixel values between a sampled image and a corresponding predicted image, the predicted images being derived from a previously estimated master image hypothesis, the method further comprising employing the output image to apply a correction to the master image hypothesis.

According to a further feature of the present invention, the function of a distance is derived from a modulation transfer function associated with an imaging sensor from which the input images were at least partially derived.

According to a further feature of the present invention, the modulation transfer function is a modulation transfer function corresponding to the distortion generated by a sensor element array of the imaging sensor.

According to a further feature of the present invention, the modulation transfer function is a modulation transfer function corresponding to the distortion generated by the combination of an optical system of the imaging sensor and a sensor element array of the imaging sensor.

According to a further feature of the present invention, the interpolation methodology includes employing an operator $H^{bp}$ corresponding to a pseudo-inverse of a modulation transfer function H associated with an imaging sensor from which the input images were at least partially derived, wherein $H^{bp}$ approximates to an inverse of H at spatial frequencies below a given value and approaches zero at spatial frequencies above the given value.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is a method and corresponding image processing system for iterative derivation of a relatively high-resolution master image from a plurality of lower resolution sampled images of non-identical, at least partially overlapping, regions of a scene. The present invention also provides a technique, useful both alone and as part of the iterative derivation, for combining a plurality of input images into a single higher resolution output image.

The principles and operation of systems and methods according to the present invention may be better understood with reference to the drawings and the accompanying description.

Figure 1:
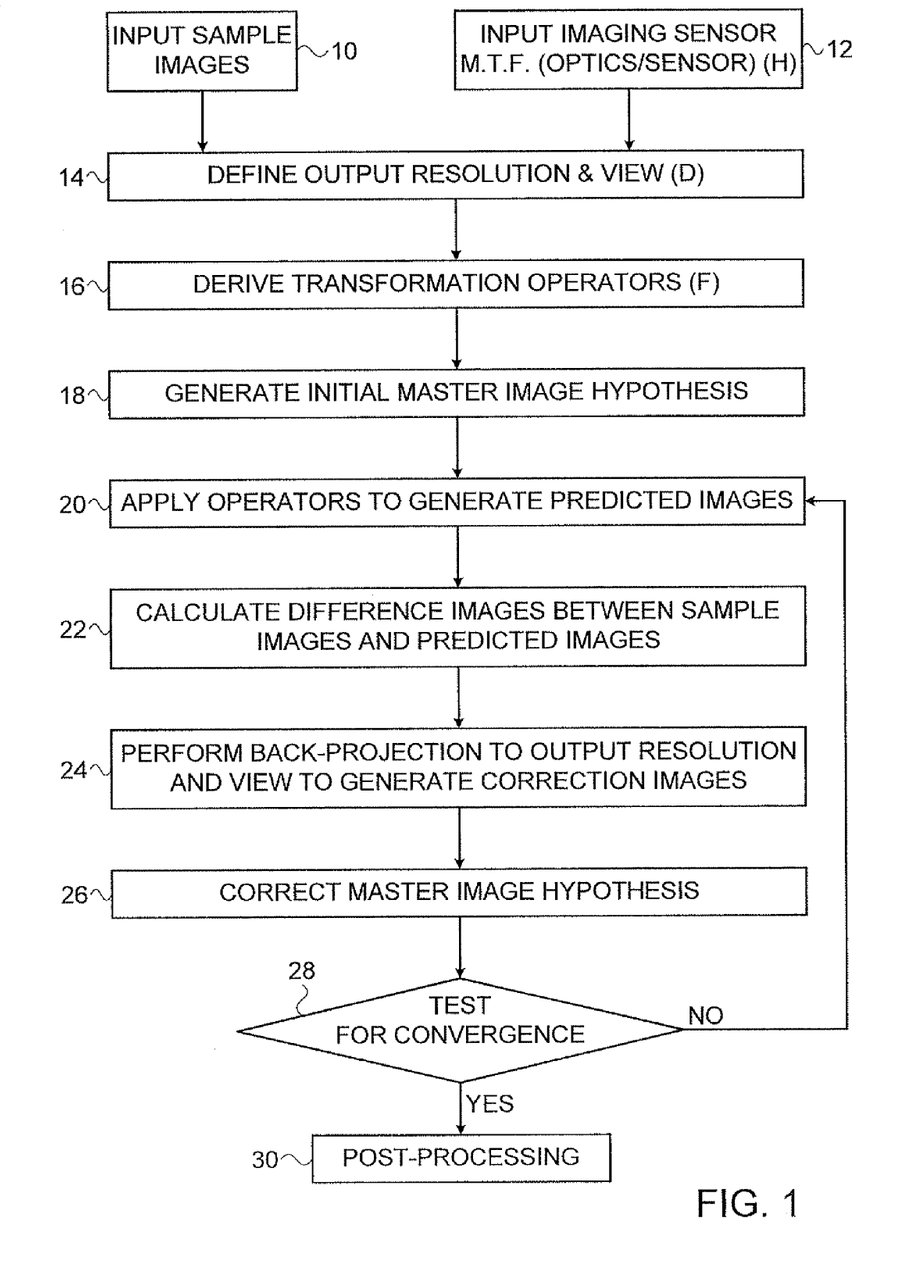
FIG. 1 is a flow diagram of a method according to the teachings of the present invention for iterative derivation of a high-resolution master image from lower resolution sampled images.

Referring now to the drawings, FIG. 1 shows a method according to the teachings of the present invention for iterative derivation of a master image from a plurality of sampled images of non-identical, at least partially overlapping, regions of a scene. The method is a "super-resolution" method in the sense that the master image has an output resolution greater than a maximum resolution of the sampled images.

Generally speaking, the method starts by inputting the sampled images (step 10), referred to herein as a vector representation $Y_k$ where k runs from 1 to N where N is the number of sampled images to be used. Also input are the imaging sensor properties (step 12), preferably expressed as at least one modulation transfer function (MTF) indicating the distortion of a real scene caused by the camera properties. This MTF is referred to as "distortion operator H". In certain cases to be discussed below, it is preferred to distinguish between separate components of the overall MTF resulting from (i) the optical arrangement of the imaging sensor and (ii) by the structure of the sensing array within the imaging sensor.

It should be noted that the sampled images $Y_k$ do not necessarily all need to have the same dimensions or resolution, and that each sampled image may have its own corresponding distortion operator. In most common applications, sampled images $Y_k$ are a sequence of images from a single imaging sensor, for example a video camera, and therefore typically have identical pixel dimensions and distortion operators, and similar resolution across a region of interest.

Before proceeding with the iterative processing, it is necessary to define what resolution output image or "master image" is required (step 14). The choice of output resolution along each linear dimension is typically at least about twice the resolution of the sampled images, and may be significantly greater. There is an upper limit, defined by factors including the distortion operator and the number of sampled images available, above which further increase in resolution is no longer helpful. The choice of resolution defines a sampling operator D for reducing an image from the output resolution to the resolution of the corresponding sampled image. Also chosen at this stage is the direction of view to be used for the master image. For simplicity, this is typically chosen to correspond to the viewpoint of one of the sampled images.

Then, at step 16, a transformation operator F is derived for each sampled image. Transformation operator F maps positions within the master image to corresponding positions in the sampled image. The transformation operators are typically derived by performing image feature registration between each sampled image and the reference sampled image chosen to be the view corresponding to the master image view. This mapping may be a simple mapping of translation, rotation and/or magnification, or may include geometrical warping or other geometrical or pixel-to-pixel mappings to correct for variations in perspective. These mappings are then modified to adjust them to the higher resolution grid of the required master image view.

Having now defined the required terminology, the problem to be solved may be stated as follows. We seek to find a "true" image $\underline{X}$ which, for all values of k from 1 to N satisfies:

$$\underline{Y_k} = D_k H_k F_k \underline{X}$$

An iterative back-projection algorithm can then be defined where, based upon a master image hypothesis $\underline{X}_j$, the next iterative approximation is given by:

$$\hat{\underline{X}}_{j+1} = \hat{\underline{X}}_j - \sum_{k=1}^{N} \underbrace{F_k^T H_k^T D_k^T}_{\text{Back projection}} [\underline{Y}_k - D_k H_k F_k \hat{\underline{X}}_j]$$

At step 18, an initial master image hypothesis is generated as a starting point for the iterative processing. Although the iterative processing converges to an acceptable solution substantially independent of the initial hypothesis, it is clearly advantageous to start from a relatively close initial hypothesis. This initial hypothesis may be generated by any of a range of conventional techniques that do not per se constitute part of the present invention. More preferably, a mathematical process is used which combines the sampled images by back-projection and then sums pixels to generate a weighted average in a manner that will be described below.

The iterative processing then begins at step 20 by applying transformation operator F, distortion operator H and sampling operator D to the current master image hypothesis so as to generate a predicted image corresponding to each sampled image, and calculating a difference image having pixel values corresponding to the difference in corresponding pixel values between the sampled image and the predicted image (step 22). On an intuitive level, it will be appreciated that operators F, H and D at least partially model the conditions of the imaging process which generated each sampled image such that, if they were applied to the "true" master image they should produce an image corresponding closely to the corresponding sampled image. Thus, the difference between the predicted image and the sampled image is a measure of the discrepancy between the current master image hypothesis and the true master image.

Then at step 24, each of the difference images undergoes "back-projection". The term "back-projection" is used herein in the description and claims to refer to any process for expanding the difference images to generate a correction image useful for correcting the current master image hypothesis. According to the mathematical analysis proposed by the aforementioned Zomet et al. reference, the back-projection in this case should be implemented by using the transposes of operators D, H and F described above. A preferred alternative implementation of back-projection according to the teachings of the present invention will be described in detail below.

Finally, at step 26, the correction images are employed to perform a correction to the current master image hypothesis to generate a new master image hypothesis, and the algorithm checks for sufficient convergence. If sufficient convergence of the solution has not yet occurred, the method returns to step 20 or the next iteration. Once sufficient convergence has occurred, the final master image hypothesis is preferably post-processed by de-blurring (step 30—to be discussed further below) to provide the final master image output.

Figure 2:
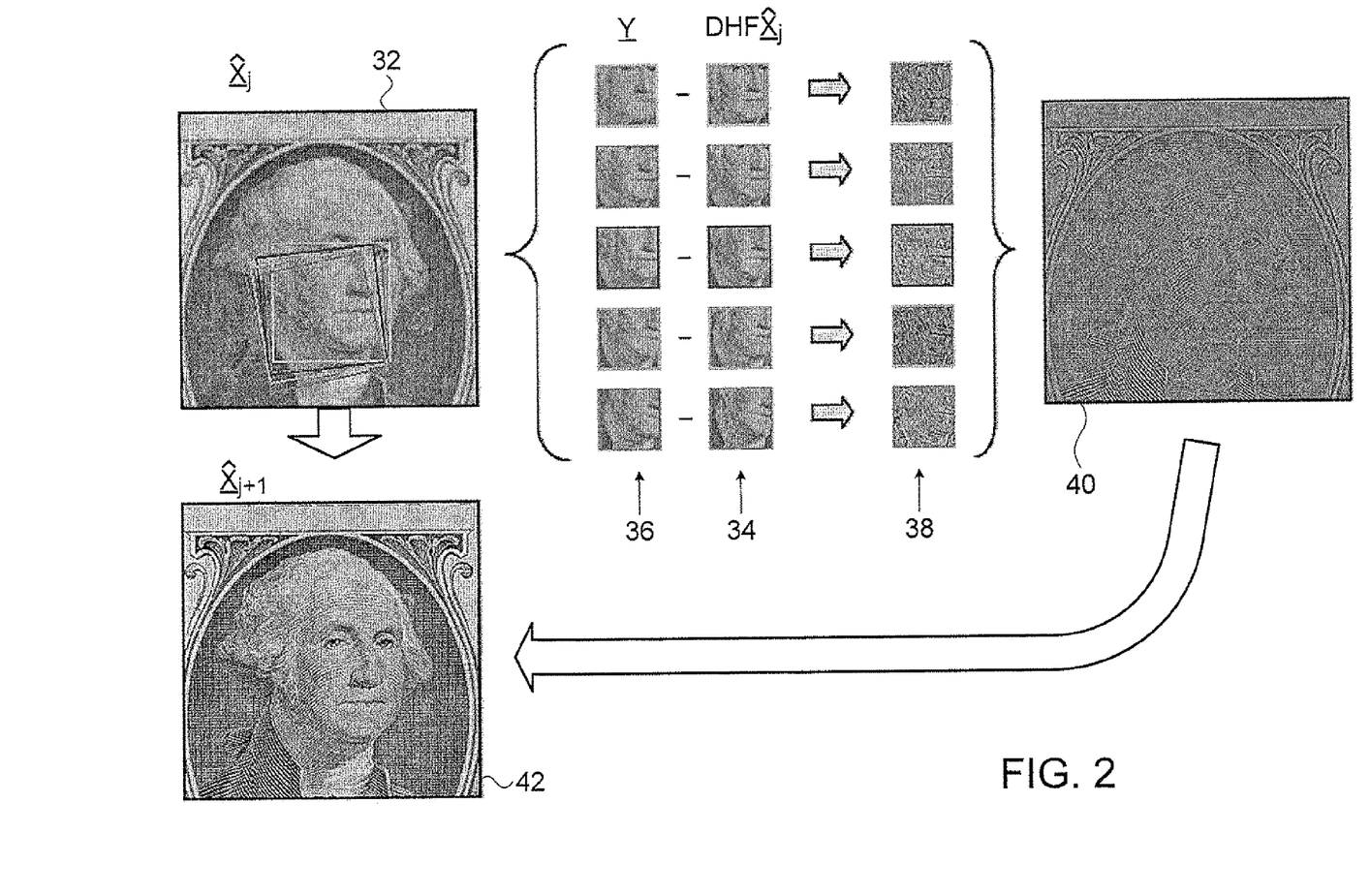
FIG. 2 is a schematic illustration of the iterative process performed by the method of FIG. 1.

The stages of this iterative process may be further understood by reference to the example of FIG. 2. Specifically, there is shown a current master image hypothesis 32 which is processed by operators D, H, F to generate a column 34 of predicted images. Predicted images 34 are then subtracted pixel-by-pixel from the corresponding sampled images 36 to generate difference images 38. These difference images are then expanded and undergo back-projection to generate correction images (shown combined at 40) which are used as a correction to the current master image hypothesis to generate a new master image hypothesis 42.

Turning now to a more detailed description of the particular distinguishing features of the present invention, these may be subdivided into three different but complementary aspects: (i) implementation of the back-projection methodology of step 24; (ii) variable weighting of pixel values in the correction images for the correction of step 26; and (iii) a simplification of the iterative process by removing part, or all, of the imaging sensor MTF from the iterative correction process and then correcting the corresponding MTF as part of the separate post-processing step 30. It should be noted that the teachings of the present invention relating to each of these three aspects are believed to be of value independent of each of the other aspects, but that these aspects combine synergistically to provide a particularly effective and efficient overall algorithm. Each of these aspects will now be addressed in turn.

Implementation of Back-Projection Methodology

As mentioned above, the mathematical treatment of Zomet et al. concludes that the "correct" operator to use in the back-projection step is the product of the transposes of operators D, H and F. In other words, they propose performing the back projection step (i.e., from low-resolution difference image to high-resolution correction image) using the transpose of the distortion operator which models the distortion in the forward direction from the "true" high-resolution image to the sampled image. In practice, however, it has been found that convergence of the iterative algorithm using this technique is slow. According to the present invention, this problem is addressed by using an inverse of the distortion operator. The true inverse $H^{-1}$ would theoretically remove distortion much more quickly, but no true inverse exists and an operator closely approximating to the true inverse would greatly increase noise. Instead, the present invention provides a pseudo-inverse, referred to herein as a "back-projection distortion operator" $H^{bp}$, which provides both relatively rapid conversion of the iteration algorithm and reliable high-quality results. The forms of the MTF for the distortion operator H, its inverse $H^{-1}$ and a preferred form of the pseudo-inverse $H^{bp}$ are shown graphically in FIG. 6. As can be seen, at low spatial frequencies, the pseudo-inverse is essentially identical to the true inverse $H^{-1}$ but decreases at higher frequencies, approaching zero at frequencies where noise levels become problematic.

Figure 6:
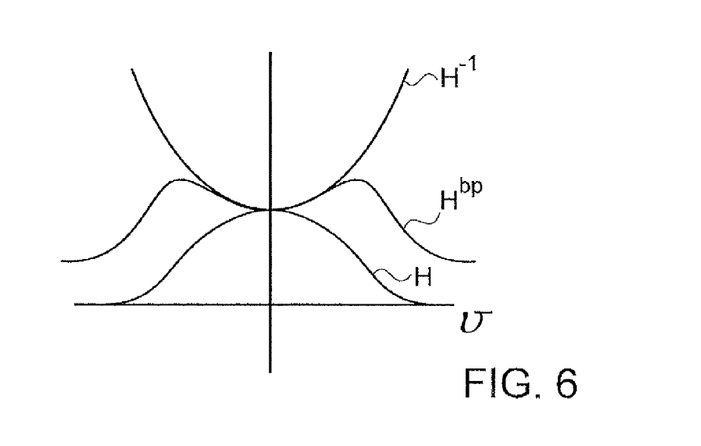
FIG. 6 is a schematic graphic representation of a distortion operator associated with an imaging sensor, the inverse operator and a pseudo-inverse for use in back-projection according to the teachings of the present invention.

By way of a non-limiting preferred example of a pseudo-inverse which exhibits the above-stated properties, the pseudo-inverse $H^{bp}$ is chosen to substantially satisfy the condition:

$$H^{bp} \times D^t \times D \times H = I$$

wherein:
  I is the unit operator for an image of the output resolution;
  D is a sampling operator for reducing an image from the output resolution to the resolution of an input image; and
  $D^t$ is an inflation operator for expanding an image from the resolution of the input image to the output resolution, for example by addition of zeros.

In intuitive terms, the above equation represents an attempt to define an inverse of the distortion operator H after information has been lost by sampling and re-inflation by D and $D^t$, respectively. Since $H^{bp}$ represents a filter and must therefore be independent of position (i.e., it is a linear space invariant ("LSI") operator), all of the rows of the matrix are identical except for a fixed shift. Furthermore, the operator is preferably chosen to be a sparse operator with a pre-chosen fixed number k of parameters (corresponding to the number of input pixel values which can affect the value of each output pixel), estimation of operator $H^{bp}$ is achieved by estimating k parameters represented by a vector $h^{bp}$. This allows the above equation to be rewritten as a matrix equation of the form:

$$M \times h^{bp} = b$$

where M is a known operator derived from operators D, $D^t$ and H, and b is a known vector derived from I. This set of linear equations can readily be solved by various numerical methods such as, but not limited to, least squares approximation.

Variable Pixel Weight in Correction Images

As described earlier, the correction images generated by back-projection step 24 are used to correct the current master image hypothesis in step 26. One conventional approach to performing this correction is by constructing an average of corresponding pixels from all the correction images. In other words, where three correction images overlap at a given pixel, the pixel value total correction value is defined as the average of the values from the corresponding pixels in all three images, such that each correction image contributes with equal weight, providing a third of the pixel value. In a region of a correction image where there is no overlap, the single available pixel value is used unmodified.

It is a particularly preferred feature of certain implementations of the present invention that pixels within each correction image are given differing weights as a function of the geometrical transformation between pixels in the high-resolution correction images and the corresponding pixel positions in the sampled images. The rationale and a preferred implementation of this approach will now be described with reference to FIGS. 3A-5C. Parenthetically, it should be noted that this feature is also applicable in other applications where a plurality of input images relating to non-identical but at least partially overlapping regions of a scene have been inflated and interpolated by any interpolation methodology and are combined to form a higher-resolution output image.

Figure 3A:
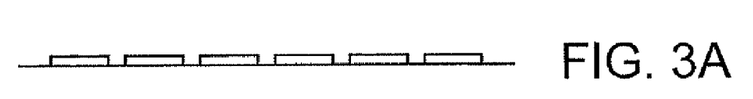
FIGS. 3A and 3B are schematic representations of the sensor array of an imaging sensor and of an associated modulation (distortion) of imaging sensitivity, respectively.
Figure 3B:
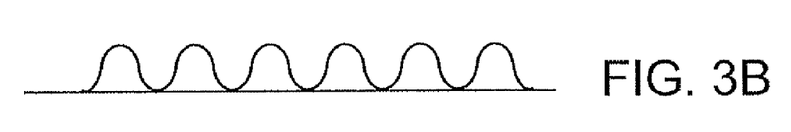
Figure 3C:
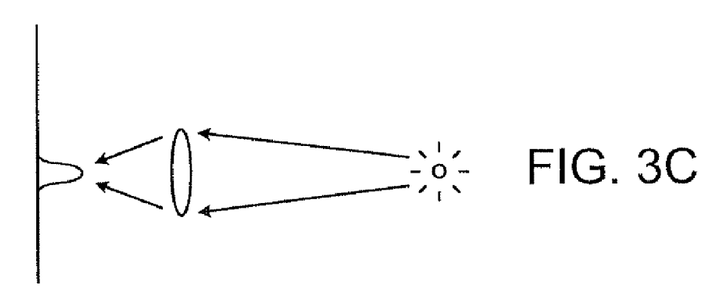
FIG. 3C is a schematic representation of a distortion (point spread function) of an optical arrangement of an imaging sensor.

Turning now to FIGS. 3A-3C, it will be appreciated that the distortion MTF of an imaging sensor is typically made up of two principle components. A first component, illustrated schematically as a point-spread function ("PSF") in FIG. 3C, results from the properties of the optical arrangement of the imaging sensor. The actual MTF of this component is essentially the Fourier transform of the PSF. A second component of the distortion MTF results from the properties and geometry of the focal-plane sensor array, shown schematically in FIG. 3A. These distortions lead to a non-uniform spatial sensitivity of the overall sensor array as illustrated schematically in FIG. 3B (each undulation relating to a separate sensor element). As a result, each sensor element is predominantly sensitive to a region of the scene viewed by a central region of the sensor element, and hence the measured pixel values are a better representation of image information at a centroid (geometrical center) of the pixel.

Figure 4A:
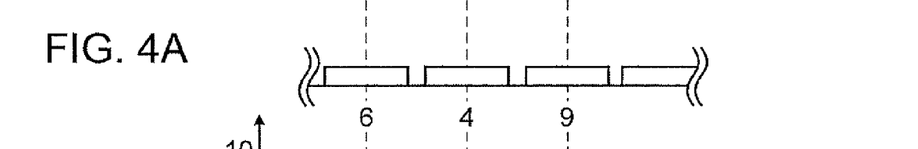
FIGS. 4A and 4B are schematic representations of a sensor array of an imaging sensor and of the associated current sampled values, respectively.
Figure 4B:
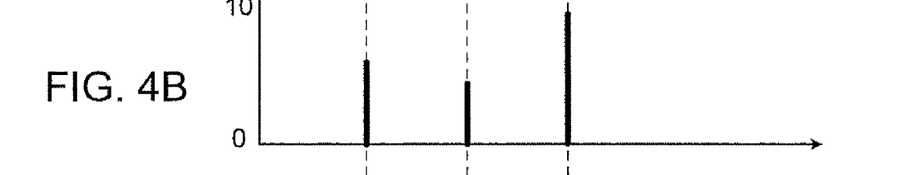
Figure 4C:
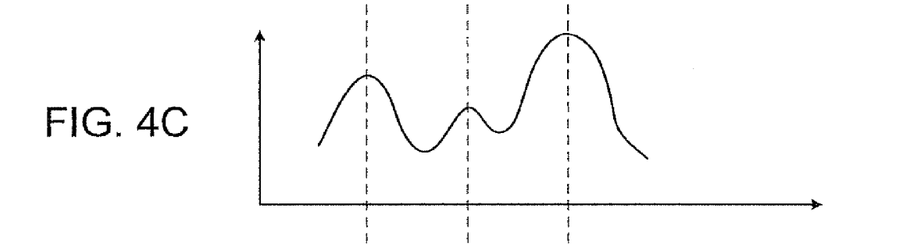
FIG. 4C is an interpolated intensity distribution derived from the samples values of FIG. 4B.

FIGS. 4A-4D illustrate schematically the implications of this modulated sensitivity in the context of the back-projection or other interpolation process. Specifically, sensor values {6, 4, 9} as measured by three sensor elements in FIG. 4A should be considered representative primarily of the sampled image values at positions corresponding to the pixel centroids as shown in FIG. 4B. Inflation of this information to the high-resolution format without interpolation would result in zero values inserted between the isolated pixels corresponding to low-resolution pixel centroids. FIG. 4C shows schematically the operation of an interpolation methodology, such as application of pseudo-inverse $H^{bp}$ described above, and FIG. 4D shows the corresponding digitized image values at the output resolution (in this example, three times greater than the input resolution).

Figure 4D:
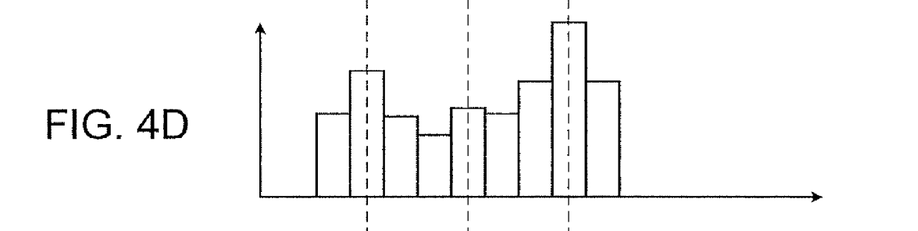
FIG. 4D are a corresponding set of high-resolution pixel values produced by transforming and inflating the distribution of FIG. 4C.
Figure 4E:
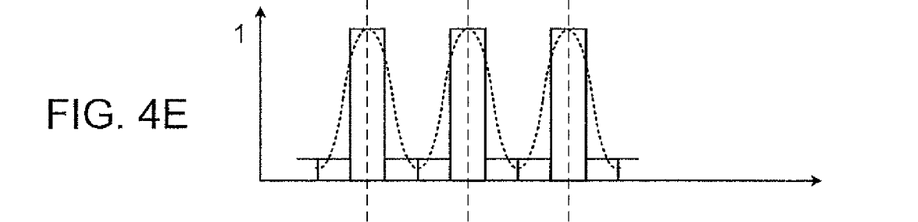
FIG. 4E is a weight function associated with the high-resolution pixel grid where the pixel weight varies as a function of distance of the equivalent point in the original image from the original pixel centroid.

In view of the non-uniform representation of sampled pixels in the output resolution pixels, it is a preferred feature of the present invention that the input images (in this case, the correction images) are combined by deriving a weighted average of values of corresponding pixels in the correction images, where the weight of each pixel in each input image is calculated as a function of a distance as measured in the sampled image between: (i) a point in the sampled image to which the pixel in the correction image is mapped by the transformation operator; and (ii) at least one pixel centroid proximal to the point. In other words, an output image pixel which corresponds closely under mapping by transformation operator F to the centroid of an input image pixel is given a relatively high "weight" factor whereas an output image pixel which corresponds to a position in the input image more distant from the closest pixel centroid(s) is given a relatively lower "weight" factor. An example of the "weight factor" distribution associated with the output pixel grid of FIG. 4D is shown in FIG. 4E. Most preferably, the function of distance used to define the weight factors is derived from distortion operator H, and preferably parallels the sensitivity distribution of FIG. 3B, shown here as a dotted curve.

Figure 5A:
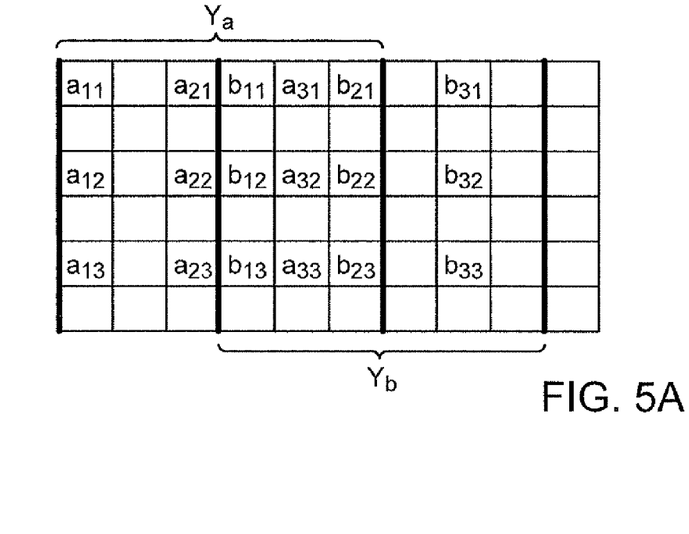
FIG. 5A is a schematic representation of a high-resolution image produced by a combination of two low-resolution images shown schematically in FIGS. 5B and 5C.
Figure 5B:
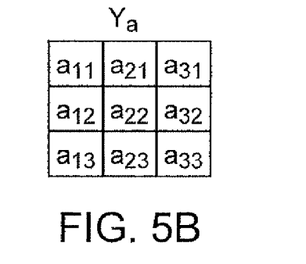
Figure 5C:
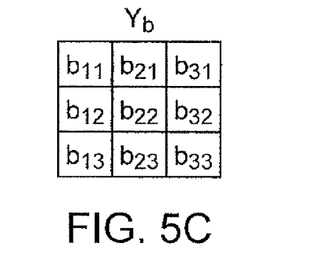

The practical implications of the weighted average technique according to the teachings of the present invention are illustrated with reference to FIGS. 5A-5C. Specifically, FIGS. 5B and 5C show two low-resolution input images $Y_a$ and $Y_b$ (e.g. sampled images or difference images) to be combined into an output image of linear resolution double the input resolution. In this case, the registration transformation defines the position of $Y_a$ at the top-left corner of the output image and $Y_b$ displaced horizontally therefrom by 3 pixels. The pixels of the output image which map to centroids of the input image pixels are here shown with the pixel values inscribed. The remaining blank pixels contain only interpolated image values (not shown). By using the weight factor distribution of the present invention, it is ensured that the more reliable image information-derived from the central region of the input pixels takes precedence over interpolated information from other input images. Thus, the value $b_{11}$ here is substantially unaffected by the interpolated value between $a_{21}$ and $a_{31}$ from the inflated $Y_a$ input image. Where no pixel-center input data is available for a given output pixel (i.e., pixels shown here blank), interpolated values from one or more inflated input images are used.

Simplification of Iterative Processing

As mentioned earlier, the MTF of an imaging sensor is generally made up of two components, a first resulting from the optical system of the imaging sensor and the second resulting from a distortion generated by the sensor element array. In the full solution of the iterative processing described above, the distortion operator H and other elements derived therefrom (e.g. $H^{bp}$) correspond to the combination of these MTFs. In certain cases, however, particularly where the viewing directions of the sampled images are generally similar, it is possible to further simplification and accelerate the processing of the iterations by removing part, or all, of the imaging sensor MTF from the iterative processing algorithm. By way of one non-limiting example, it has been found effective to subdivide the MTF into its two separate factors and removing the optical MTF from the distortion operator H used in the iterations. In other words, the distortion operator H used corresponds to the MTF resulting from the sensor element array and does not include the MTF resulting from the optical system. The result is that the iterations effectively reconstruct the "true" image modified by the optical MTF distortion. This renders the calculations simpler and leads to faster convergence of the iterations to a final value. In an alternative example, the entire imaging sensor MTF may be removed from the iterative back-projection. In some cases, it is necessary to include some basic interpolation function in place of the omitted operator H. The post-processing step 30 then includes performing deconvolution (deblurring) of the output image to substantially correct distortion resulting from the optical system MTF. This deconvolution may be performed by any of a number of known deconvolution techniques. The deconvolution process of the post processing is thus rendered very much more efficient since it is performed only once on the final image rather than on each sampled image.

It will be appreciated that the above descriptions are intended only to serve as examples, and that many other embodiments are possible within the scope of the present invention as defined in the appended claims.

What is claimed is:

1. A method for iterative derivation of a master image from a plurality of sampled images of non-identical, at least partially overlapping, regions of a scene, the master image having an output resolution greater than a maximum resolution of the sampled images, the method comprising:
 (a) for each sampled image, defining:
  (i) a transformation operator F mapping positions within the master image to corresponding positions in the sampled image,
  (ii) a distortion operator H simulating a distortion associated with an imaging sensor from which the sampled image was generated, and
  (iii) a sampling operator D for reducing an image from the output resolution to the resolution of the sampled image;
 (b) for each sampled image, applying said transformation operator, said distortion operator and said sampling operator to a current master image hypothesis so as to generate a predicted image, and calculating a difference image having pixel values corresponding to the difference in corresponding pixel values between the sampled image and the predicted image;
 (c) performing back-projection of each of said difference images to generate a correction image for the current master image hypothesis; and
 (d) employing said correction images to perform a correction to the current master image hypothesis to generate a new master image hypothesis,
 wherein said back projection includes employing an operator $H^{bp}$ corresponding to a pseudo-inverse of, distortion operator H, wherein $H^{bp}$ approximates to an inverse of H at spatial frequencies below a given value and approaches zero at spatial frequencies above said given value, and wherein $H^{bp}$ is chosen to substantially satisfy the condition:

$$H^{bp} \times D^t \times D \times H = I$$

wherein:
 I is the unit operator for an image of the output resolution;
 D is a sampling operator for reducing an image from the output resolution to the resolution of an input image; and
 $D^t$ is an inflation operator for expanding an image from the resolution of the input image to the output resolution.

2. The method of claim 1, wherein distortion operator H corresponds to a combination of a modulation transfer function resulting from an optical system of the imaging sensor and a modulation transfer function resulting from a distortion generated by a sensor element array of the imaging sensor.

3. The method of claim 1, wherein distortion operator H corresponds to a modulation transfer function describing only a first portion of a distortion generated by the imaging sensor, the method further comprising a post-processing step of deconvoluting a final master image hypothesis to substantially correct a modulation transfer function describing a remainder of a distortion generated by the imaging sensor.

4. A method for iterative derivation of a master image from a plurality of sampled images of non-identical, at least partially overlapping, regions of a scene, the master image having an output resolution greater than a maximum resolution of the sampled images, the method comprising:
 (a) for each sampled image, defining:
  (i) a transformation operator F mapping positions within the master image to corresponding positions in the sampled image,
  (ii) a distortion operator H simulating a distortion associated with an imaging sensor from which the sampled image was generated, and
  (iii) a sampling operator D for reducing an image from the output resolution to the resolution of the sampled image;
 (b) for each sampled image, applying said transformation operator, said distortion operator and said sampling operator to a current master image hypothesis so as to generate a predicted image, and calculating a difference image having pixel values corresponding to the difference in corresponding pixel values between the sampled image and the predicted image;
 (c) performing back-projection of each of said difference images to generate a correction image for the current master image hypothesis; and
 (d) employing said correction images to perform a correction to the current master image hypothesis to generate a new master image hypothesis,
 wherein said back projection includes employing an operator $H^{bp}$ corresponding to a pseudo-inverse of distortion operator H, wherein $H^{bp}$ approximates to an inverse of H at spatial frequencies below a given value and approaches zero at spatial frequencies above said given value, and wherein said correction to the current master image hypothesis includes combining the correction images by deriving a weighted average of values of corresponding pixels in said correction images, the weight of each pixel in each correction image being calculated as a function of a distance as measured in the sampled image between: (i) a point in the sampled image to which the pixel in the correction image is mapped by the transformation operator; and (ii) at least one pixel centroid proximal to said point.

5. The method of claim 4, wherein said function of a distance is derived from distortion operator H.

* * * * *